US008430141B2

(12) United States Patent
Garnett

(10) Patent No.: US 8,430,141 B2
(45) Date of Patent: Apr. 30, 2013

(54) WOODWORKING FIXTURE

(76) Inventor: Mark D. Garnett, Oakland, MI (US)

( * ) Notice: Subject to any disclaimer, the term of this patent is extended or adjusted under 35 U.S.C. 154(b) by 114 days.

(21) Appl. No.: 12/758,450

(22) Filed: Apr. 12, 2010

(65) Prior Publication Data
US 2010/0258215 A1 Oct. 14, 2010

Related U.S. Application Data

(60) Provisional application No. 61/168,777, filed on Apr. 13, 2009.

(51) Int. Cl.
*B27C 9/00* (2006.01)
*B27L 3/00* (2006.01)
*B27M 3/00* (2006.01)

(52) U.S. Cl.
USPC ..... 144/2.1; 144/134.1; 144/135.2; 144/154.5; 408/24

(58) Field of Classification Search ............... 144/134.1, 144/135.2, 135.3, 2.1, 154.5; 408/24, 25, 408/26
See application file for complete search history.

(56) References Cited

U.S. PATENT DOCUMENTS

| 1,128,970 | A | 2/1915 | Godefroy et al. |
| 1,335,544 | A | 3/1920 | Anders |
| 1,602,658 | A | 10/1926 | Germain |
| 2,260,784 | A | 10/1941 | Morton |
| 2,602,238 | A | 7/1952 | Wellman |
| 2,674,907 | A | 4/1954 | Zoll |
| 2,849,900 | A | 9/1958 | Heidtman, Jr. |
| 2,953,045 | A | 9/1960 | Carles |
| 3,086,408 | A | 4/1963 | Donals |
| 3,100,408 | A | 8/1963 | Pufahl |
| 3,288,183 | A | 11/1966 | Eisbrenner |
| 3,386,318 | A | 6/1968 | Pekarcik et al. |
| 3,496,974 | A | 2/1970 | Munsil et al. |
| 3,534,639 | A | 10/1970 | Treichler |
| 3,626,513 | A | 12/1971 | Pytlak |
| 3,675,312 | A | 7/1972 | Herman |
| 3,890,058 | A | 6/1975 | Self et al. |
| 4,199,283 | A | 4/1980 | Perry |
| 4,235,565 | A | 11/1980 | Albano |
| 4,385,755 | A | 5/1983 | Mawer |
| 4,492,498 | A | 1/1985 | Kaufman |
| 4,594,032 | A | 6/1986 | Warburg |
| 4,601,618 | A | 7/1986 | McEldowney |
| 4,603,719 | A | 8/1986 | Durney |
| 4,730,959 | A | 3/1988 | Aerni et al. |
| 4,865,496 | A | 9/1989 | Challis |
| 4,944,627 | A | 7/1990 | Durney |
| 4,955,766 | A | 9/1990 | Sommerfeld |
| 5,063,982 | A | 11/1991 | Durney |
| 5,150,993 | A | 9/1992 | Miller |
| 5,181,746 | A | 1/1993 | Hessel et al. |
| 5,375,636 | A | 12/1994 | Bosten et al. |
| 5,553,645 | A | 9/1996 | Durney |
| 5,676,500 | A | 10/1997 | Sommerfeld |
| 5,791,835 | A | 8/1998 | Chiang et al. |
| 6,481,937 | B1 | 11/2002 | Sommerfeld et al. |
| 6,599,064 | B1 | 7/2003 | Robinson |
| 6,726,411 | B2 | 4/2004 | Sommerfeld et al. |
| 7,165,300 | B2 | 1/2007 | Phillips et al. |

*Primary Examiner* — Bena Miller
(74) *Attorney, Agent, or Firm* — Carlson, Gaskey & Olds PC

(57) ABSTRACT

A fixture includes a router guide portion having a router support surface and a workpiece support surface, a drill guide portion having a drill bit member, an opening adjacent the router guide portion and the drill guide portion for accepting a workpiece, and a clamping portion. The clamping portion includes a clamping member for securing the workpiece to the router guide portion.

13 Claims, 24 Drawing Sheets

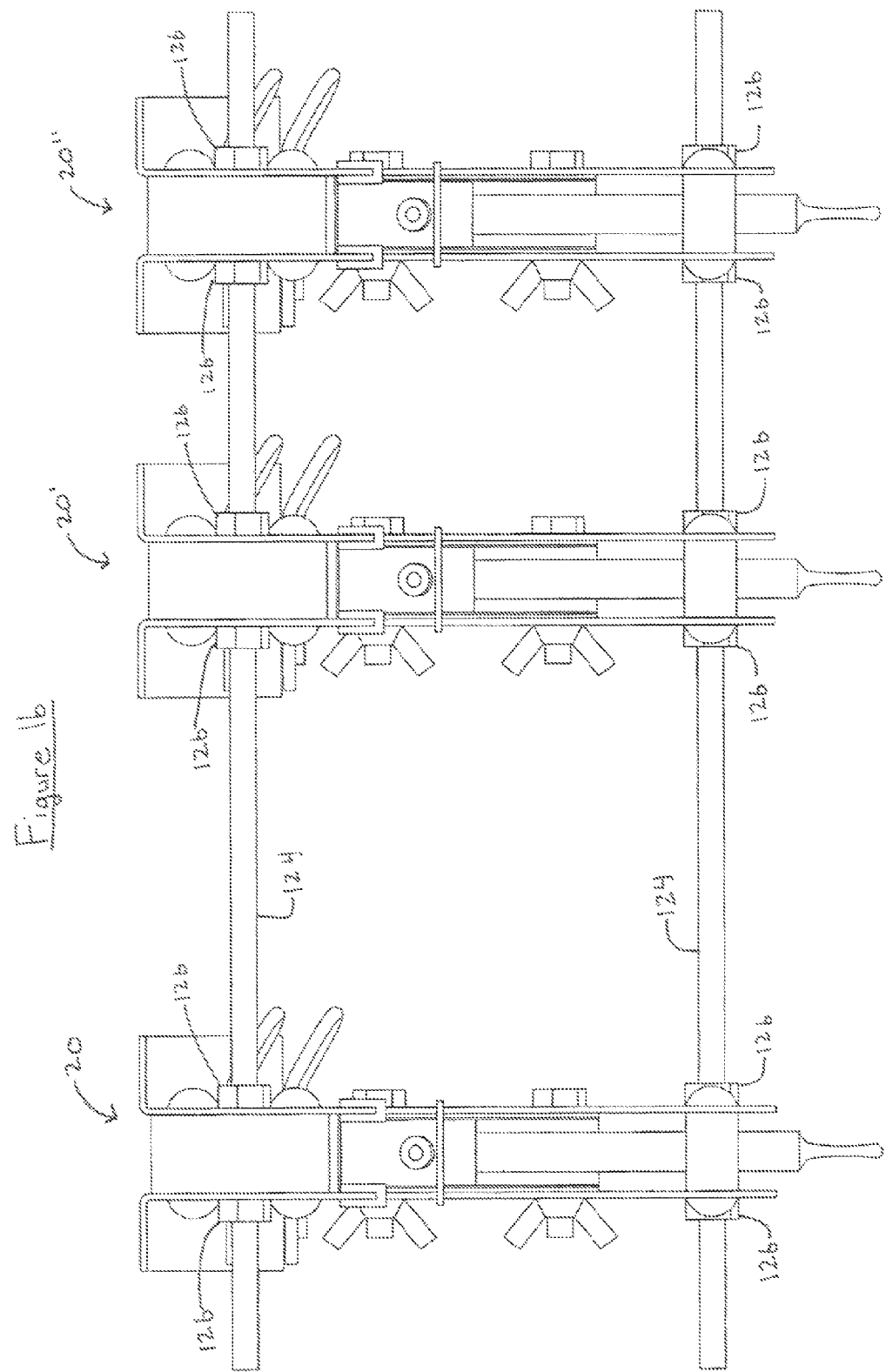

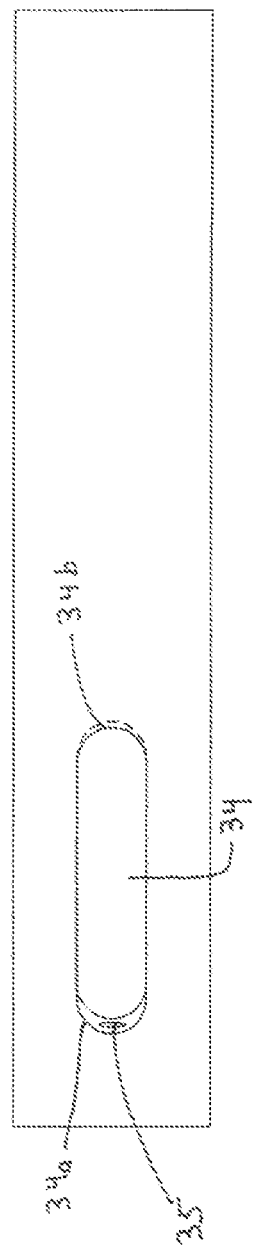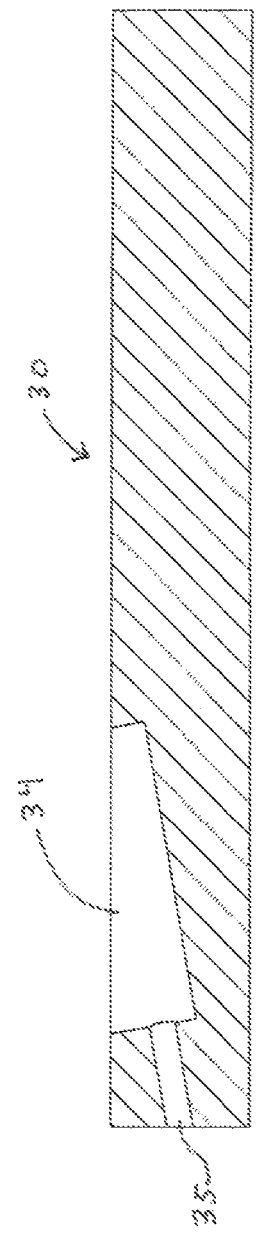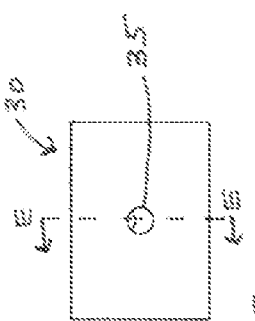

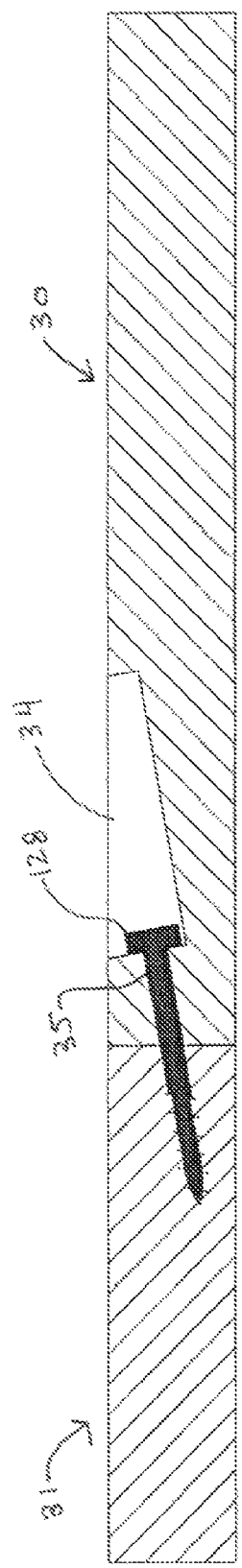

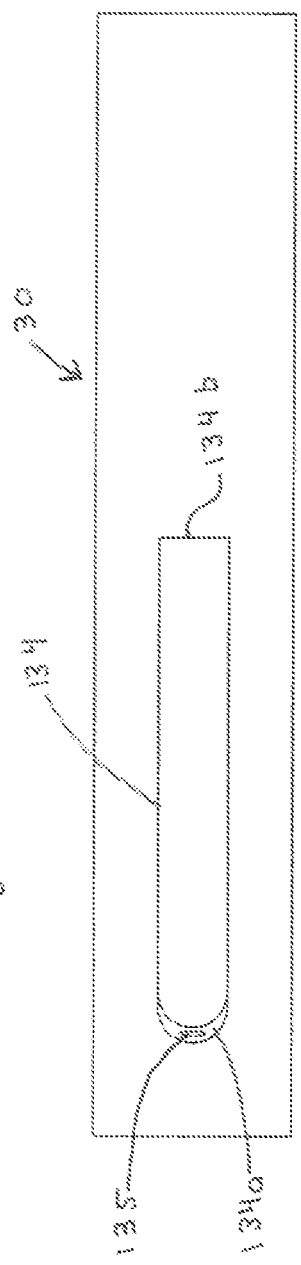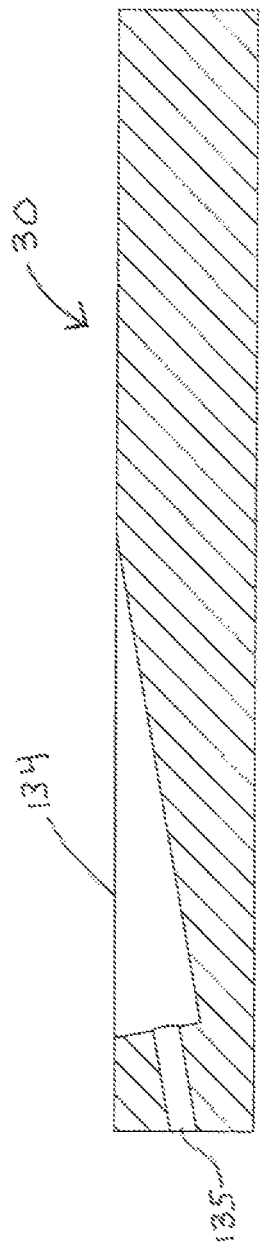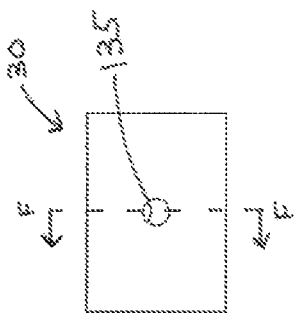

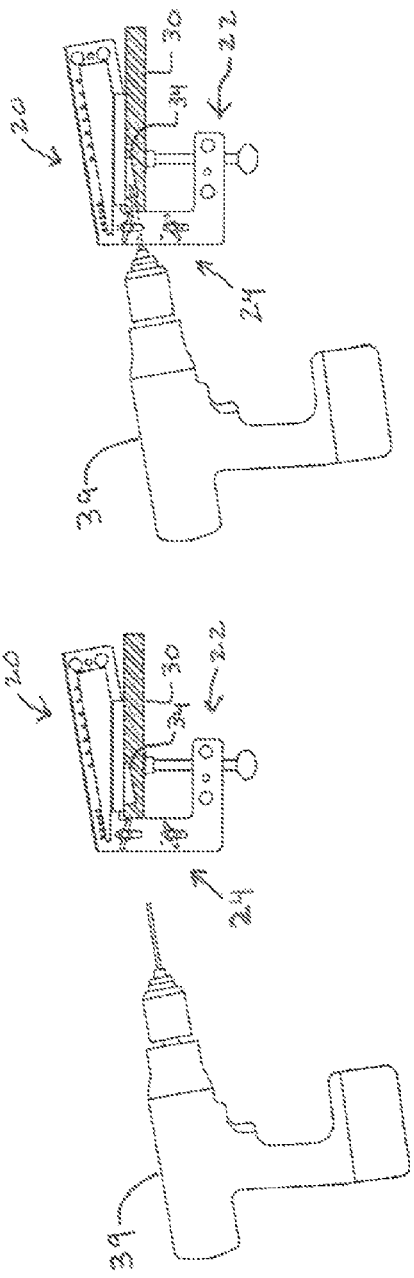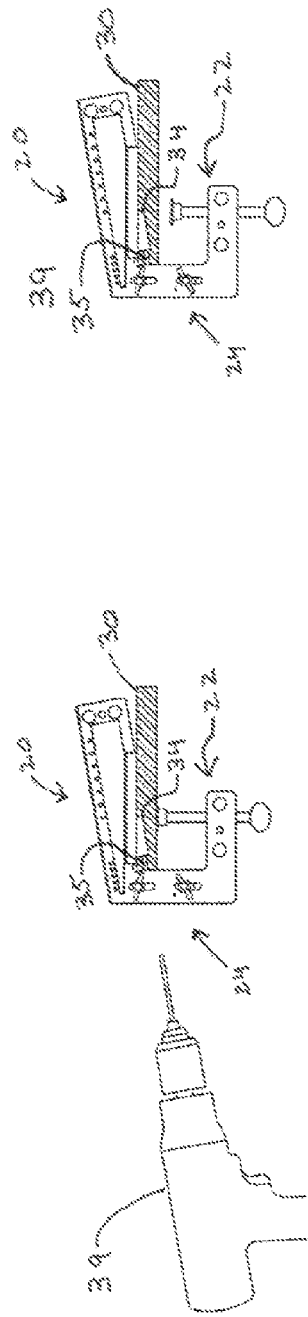

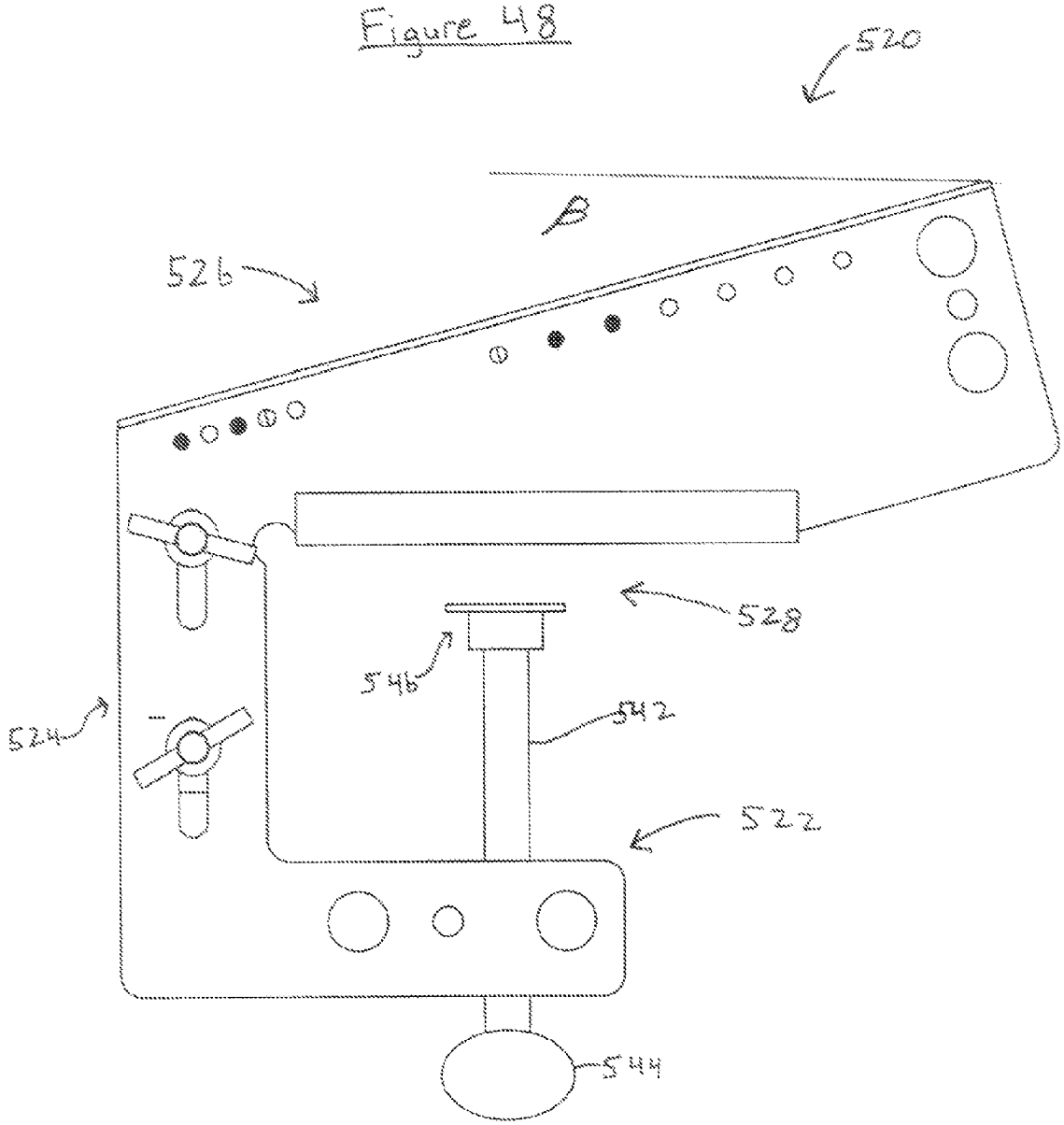

WOODWORKING FIXTURE

This application claims priority to U.S. Provisional Application No. 61/168,777 filed on Apr. 13, 2009

BACKGROUND OF THE INVENTION

This disclosure generally relates to a fixture. More particularly, this disclosure relates to a woodworking fixture for creating pocket mortises.

Pocket mortises are commonly used in applications such as furniture and cabinetry making. Pocket mortises allow a fastener, such as a nail or screw, to extend through an edge or face of one board into an edge of another board.

SUMMARY OF THE INVENTION

A fixture includes a router guide portion having a router support surface and a workpiece support surface, a drill guide portion having a drill bit member, an opening adjacent the router guide portion and the drill guide portion for accepting a workpiece, and a clamping portion. The clamping portion includes a clamping member for securing the workpiece to the router guide portion.

A pocket for a joint is formed by attaching a workpiece to a fixture and inserting a router into a router guide portion of the fixture. The router engages the workpiece to form a pocket mortise and is removed from the fixture after the pocket is formed A pocket-mortise joint includes a first workpiece having a first surface and a second surface adjacent the first surface. The first surface includes a pocket having a base wall and a side wall surrounding the base wall. An opening extends from the second surface into the pocket. An edge of a second workpiece is located adjacent the second surface of the first workpiece and a retention member extends from the pocket into the second workpiece to secure the first workpiece to the second workpiece.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 16 illustrates a plurality of example fixtures mounted to alignment rods.

FIG. 17 illustrates a top view of an example pocket mortise.

FIG. 18 illustrates an end view of the example pocket mortise.

FIG. 19 illustrates a cross-sectional view of the example pocket mortise along line E-E of FIG. 18.

FIG. 20 illustrates a cross-sectional view of the workpiece attached to a mating workpiece.

FIG. 21 illustrates a top view of another example pocket mortise.

FIG. 22 illustrates an end view of the example pocket mortise of FIG. 21.

FIG. 23 illustrates a cross-sectional view of the example pocket mortise along line F-F of FIG. 22.

FIGS. 41-44 illustrate an example method of forming a screw opening.

FIG. 46 illustrates an example transparency for use with the example adjustment template.

FIG. 48 illustrates a side view of another example fixture.

DETAILED DESCRIPTION OF THE PREFERRED EMBODIMENT

Figure 1:
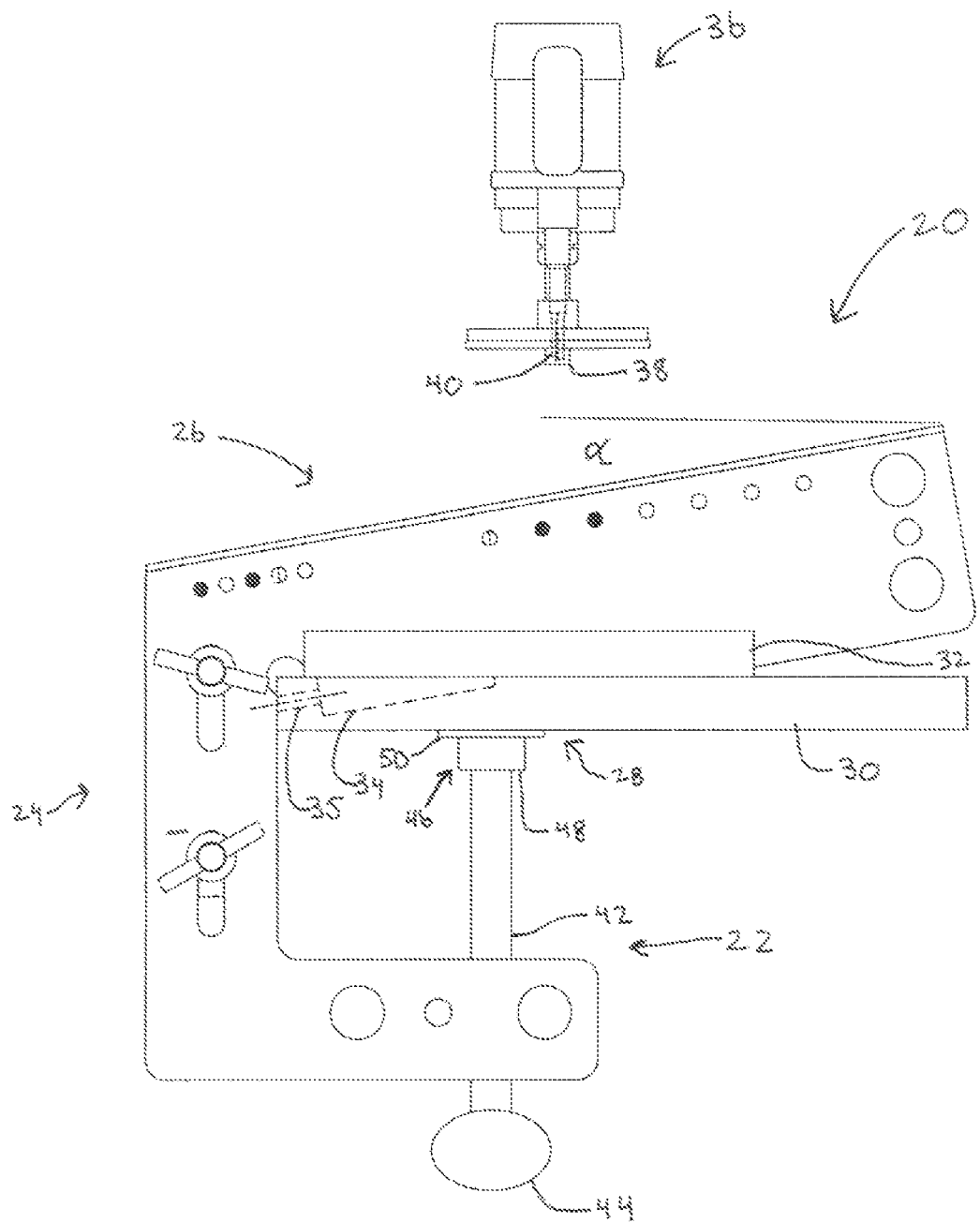
FIG. 1 illustrates a side view of an example fixture and router.

FIG. 1 illustrates a side view of an example woodworking fixture 20 having a clamping portion 22, a drill guide portion 24, and a router guide portion 26. The fixture 20 includes an opening 28 for accepting a workpiece 30, such as a board made of wood or another similar natural or synthetic material.

Figure 6:
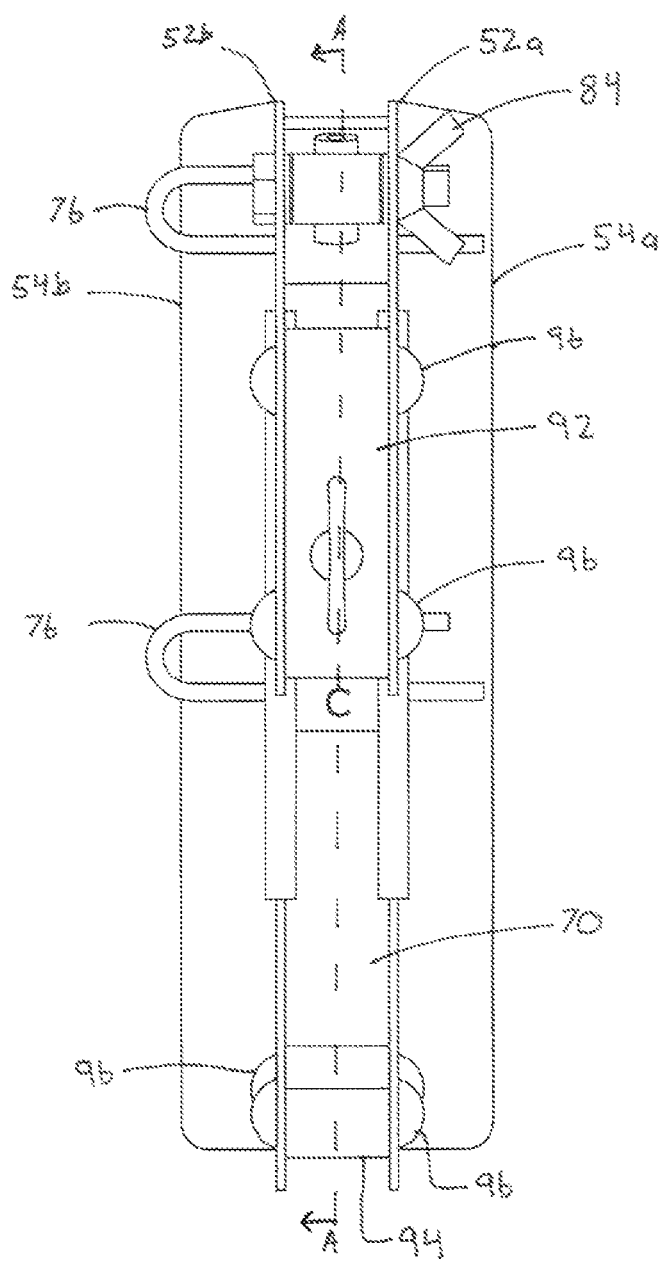
FIG. 6 illustrates a bottom view of the example fixture.

The workpiece 30 is secured in the opening 28 adjacent the router guide portion 26 and the drill guide portion 24 by the clamping portion 22. A guard 32 covers the router guide portion 26 to protect the workpiece 30. The clamping portion 22 includes a threaded elongated shaft 42 extending through a clamping block 92 (FIG. 6). The elongated shaft 42 includes an engaging member 46, such as a conical Keps nut, at a first end that engages the workpiece 30 and a handle 44 at a second end. The engaging member 46 includes a retainer member 48 fixedly attached to the elongated shaft 42 and an upper support member 50 rotatably attached to the retainer member 48. The handle 44 allows the user to rotate the elongated shaft 42 in a first direction towards the workpiece 30 or in a second direction away from the workpiece 30 to remove the workpiece 30 from the opening 28.

The router guide portion 26 accepts a router 36, such as a conventional fixed base router, a plunge type router, a table mounted router, or another similar router that is separate from the fixture 20. The router 36 includes a router collar 38 surrounding a router bit 40, such as a straight plunge cutting router bit. The collar 38 communicates with the router guide portion 26 to guide the router bit 40 into the workpiece 30 to form a pocket mortise 34 (shown in hidden lines) in an upper surface of the workpiece 30. The router guide portion 26 has an angle of incline a of approximately ten degrees. However, the angle of incline may vary depending on the application.

The drill guide portion 24 accepts a drill bit from a drill 39 (FIG. 41) to form a screw opening 35 (shown in hidden lines) that extends from an edge of the workpiece 30 into the pocket 34.

Figure 2:
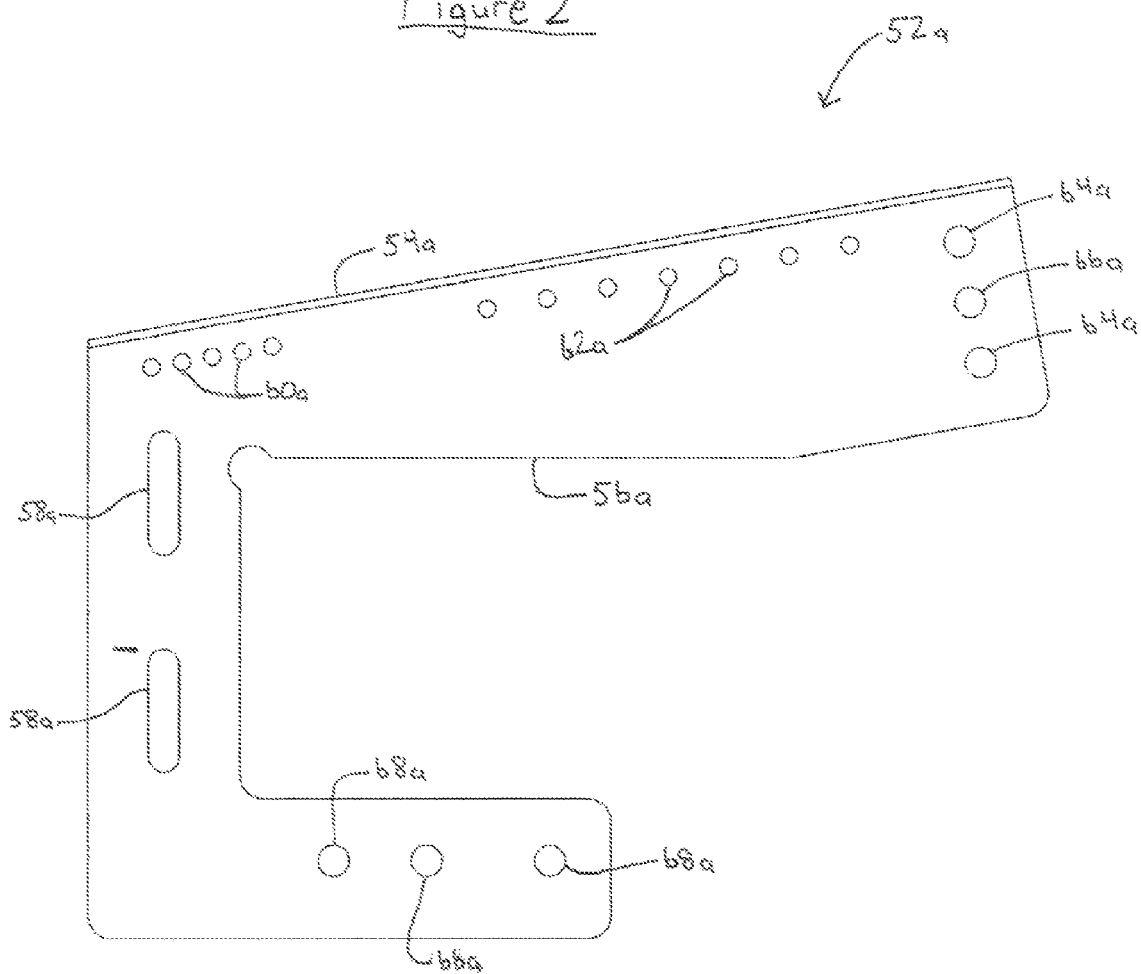
FIG. 2 illustrates a side view of a first fixture half of the example fixture.

FIG. 2 illustrates a side view of a first fixture half 52a including a first router guide member 54a and a workpiece support surface 56a. The first fixture half 52a further includes elongated openings 58a, first stop openings 60a, second stop openings 62a, spacer block openings 64a, alignment rod openings 66a, and clamping block openings 68a.

Figure 3:
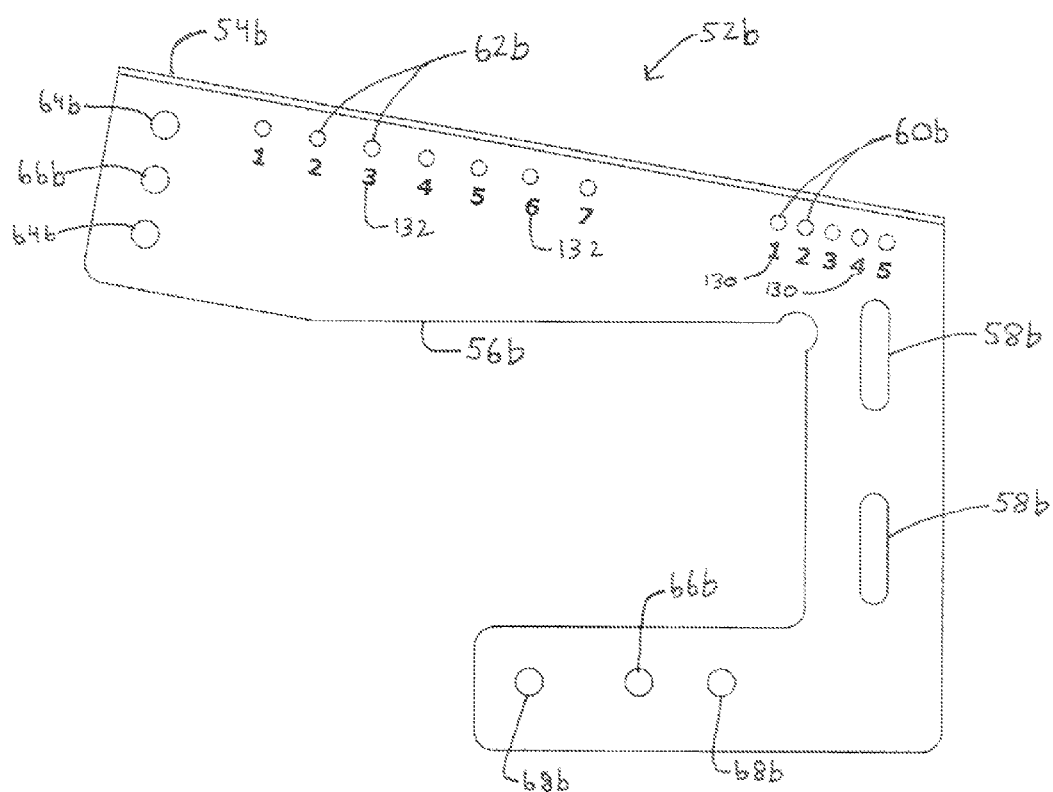
FIG. 3 illustrates a side view of a second fixture half of the example fixture.

FIG. 3 illustrates a side view of a second fixture half 52b including a second router guide member 54b and a workpiece support surface 56b. The second fixture half 52b further includes elongated openings 58b, first stop openings 60b, second stop openings 62b, spacer block openings 64b, alignment rod openings 66b, and clamping block openings 68b.

The first and second fixture halves 52a and 52b are substantially mirror images and are made from a single sheet of metal or plastic through a stamping, milling, cutting, or other similar process.

Figures 4A, 4B:
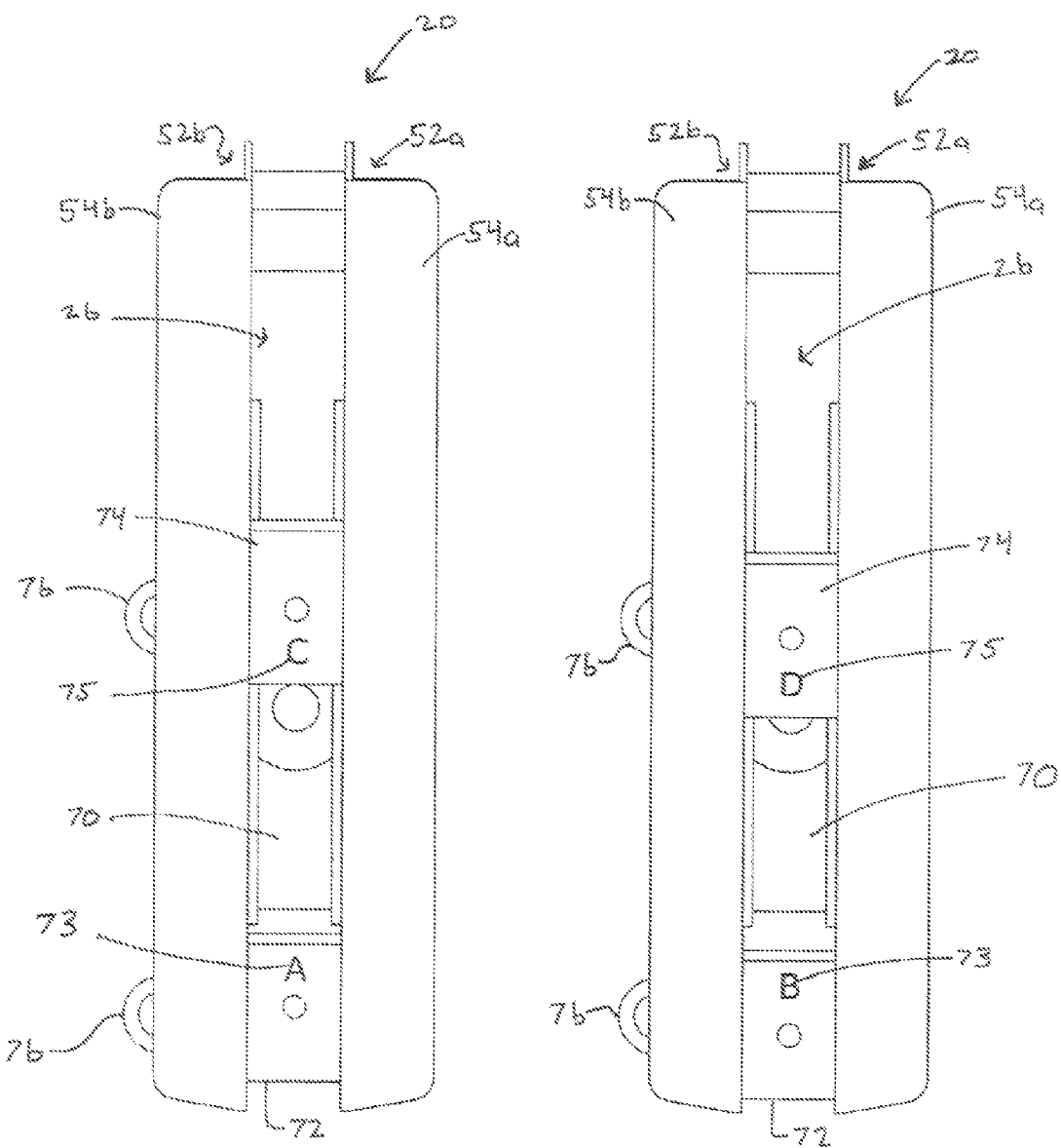
FIG. 4a illustrates a top view of the example fixture.
FIG. 4b illustrates another top view of the example fixture.

FIG. 4a illustrates a top view of the fixture 20. The router guide portion 26 includes the first router guide member 54a on the first fixture half 52a and the second router guide member 54b on the second fixture half 52b. The first and second fixture halves 52a and 52b define a channel 70. A first router stop 72 extends across a first end of the channel 70 and is secured by a router stop fastener 76 extending through first stop openings 60a and 60b (FIGS. 2 and 3). A second router stop 74 extends across a second end of the channel 70 and is secured by another router stop fastener 76 extending through second stop openings 62a and 62b (FIGS. 2 and 3). The first and second router stops 72 and 74 includes markers 73 and 75, respectively, on opposite sides that indicate orientation (FIGS. 4a and 4b). Although the router stop fasteners 76 are shown as clips, one of ordinary skill in the art would recognize that bolts, screws, roll pins, cotter pins, or another similar devices could also be used.

Figure 7:
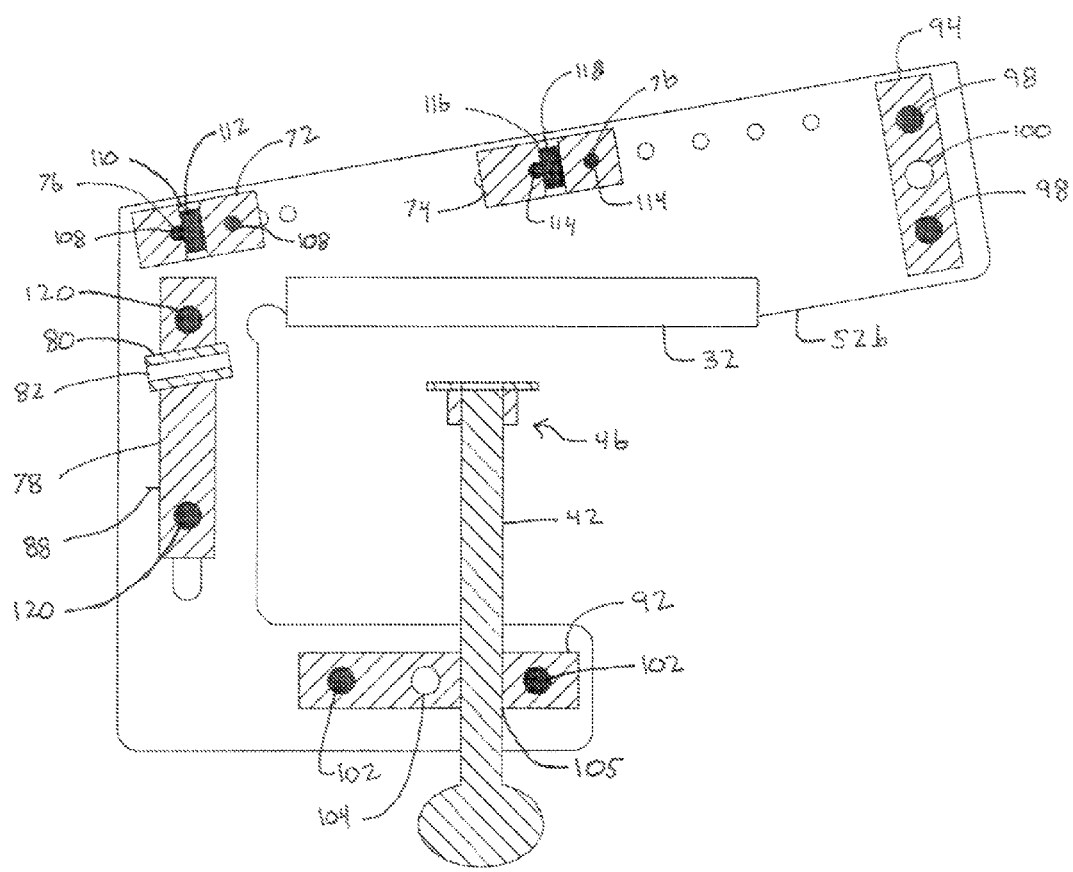
FIG. 7 illustrates a cross-sectional view of the example fixture along line A-A of FIG. 6.

The length of the channel 70 between the first and second router stops 72 and 74 varies according to their alignment with first and second stop openings 60 and 62 (FIGS. 2 and 3) and their orientation as indicated by markers 73 and 75, respectively. Rotating the first or second router stops 72 and 74 to display different marker 73 and 75, respectively, while keeping the first and second router stops 72 and 74 aligned with the same first and second stop openings 60 and 62 (FIGS. 2 and 3) varies the length of the channel 70 by smaller increments than aligning the first and second router stops 72 and 74 with an adjacent set of first and second stop openings 60 and 62 (FIGS. 2 and 3). The first and second router stops 72 and 74 change the length of the channel 70 by smaller increments because fastener openings 108 and 114 are located closer a first end of the first and second router stops 72 and 74, respectively, than to the second end (FIG. 7).

Figure 5:
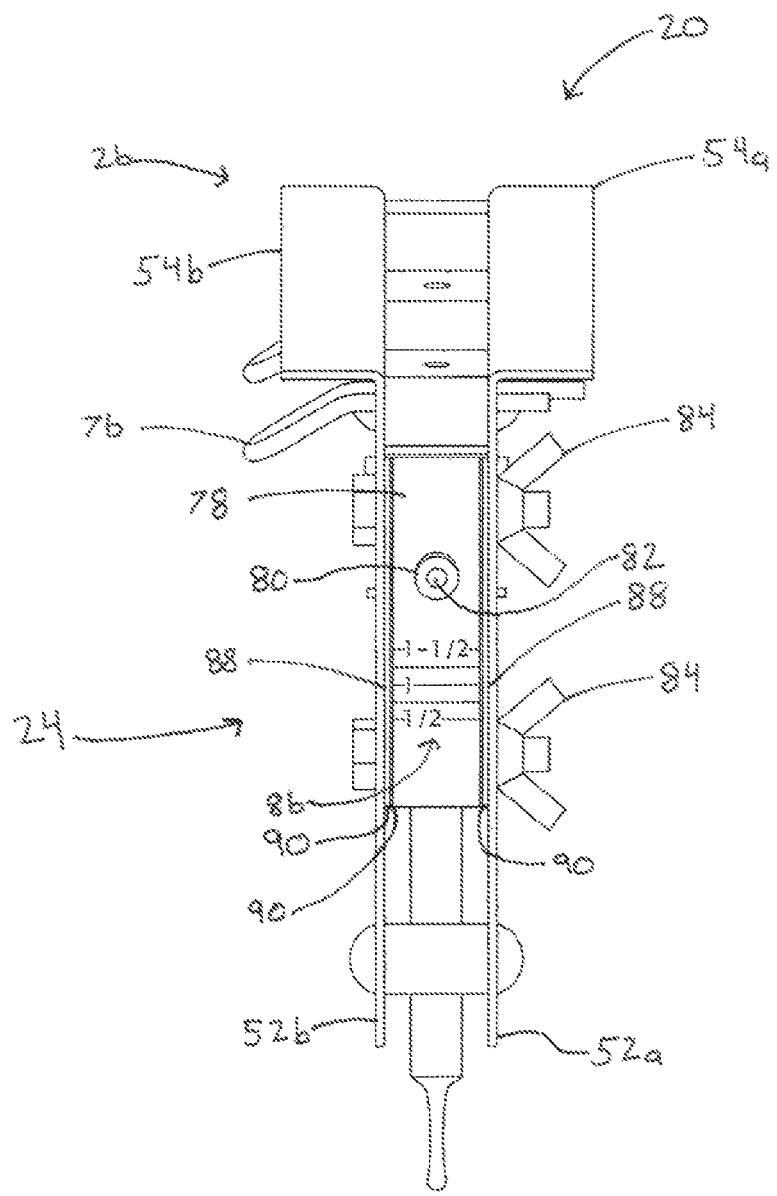
FIG. 5 illustrates an end view of the example fixture.

FIG. 5 illustrates an end view of the fixture 20 showing the drill guide portion 24. The drill guide portion 24 includes a drill bit member 78 having at least one drill bit sleeve 80 extending through the drill bit member 78 towards the opening 28. The drill bit sleeve 80 includes a central opening 82 for guiding the drill bit through the drill bit member 78. The drill bit sleeve 80 is made from hardened steel or another material of similar strength and durability.

The drill bit member 78 moves toward or away from the router guide portion 26 by loosening the drill bit member fasteners 84 and sliding the drill bit member 78 along the length of the elongated openings 58a and 58b (FIGS. 2 and 3). The drill bit member 78 is properly aligned when the workpiece thickness markings 86 that corresponds with the thickness of the workpiece 30 is aligned with fixture thickness markings 88, such as openings or symbols, located on the first and second fixture halves 52a and 52b. Alternatively, the workpiece thickness markings 86 may be used to align the drill bit member 78 with the center of a mating workpiece 31 (FIG. 20) when the mating workpiece 31 and the workpiece 30 are different thicknesses.

Spacers 90 of varying thickness are located between the drill bit member 78 and the first and second fixture halves 52a and 52b to allow for lateral movement of the drill bit member 78. To move the drill bit member 78 laterally, at least one spacer 90 is removed from a first side of the drill bit member 78 and placed on a second side of the drill bit member 78.

FIG. 6 is a bottom view of the fixture 20 showing the clamping block 92 and a spacer block 94. Fastening members 96, such as bolts, screws, or rivets, secure the clamping block 92 and the spacer block 94 between the first and second fixture halves 52a and 52b. Alternatively, the first and second fixture halves 52a and 52b may be welded to the clamping block 92 and the spacer block 94.

FIG. 7 is a cross-sectional view of the fixture 20 taken along line A-A of FIG. 6 showing the spacer block 94, the first router stop 72, the second router stop 74, the drill bit member 78, and the clamping block 92.

The spacer block 94 includes fastener openings 98 and an alignment rod opening 100 located between the fastener openings 98.

The clamping block 92 includes fastener openings 102, an alignment rod opening 104, and a shaft opening 105 substantially perpendicular to the fastener openings 102 and the alignment rod opening 104.

The first router stop 72 includes fastener openings 108 for accepting the router stop fastener 76. A first plug opening 110 partially extends through at least one of the fastener openings 108. A first plug 112 made of a deformable material, such as rubber, is located in the first plug opening 110 to frictionally secure the router stop fastener 76 within the fastener openings 108. The fastener openings 108 are positioned towards a first end of the first router stop 72.

The second router stop 74 includes fastener openings 114. A second plug opening 116 partially extending through at least one of the fastener openings 114. A plug 118 made of a deformable material, such as rubber, is located in the plug opening 116 to frictionally secure the router stop fastener 76. The fastener openings 114 are positioned towards a first end of the second router stop 74.

The drill bit member 78 includes fastener openings 120 and the drill bit sleeve 80 extending through the drill bit member 78 having the central opening 82.

Although the spacer block 94, the first router stop 72, the second router stop 74, the drill bit member 78, and the clamping block 92 are shown as being generally rectangular, they may be any shape suitable to accomplish the function described herein.

Figure 8:
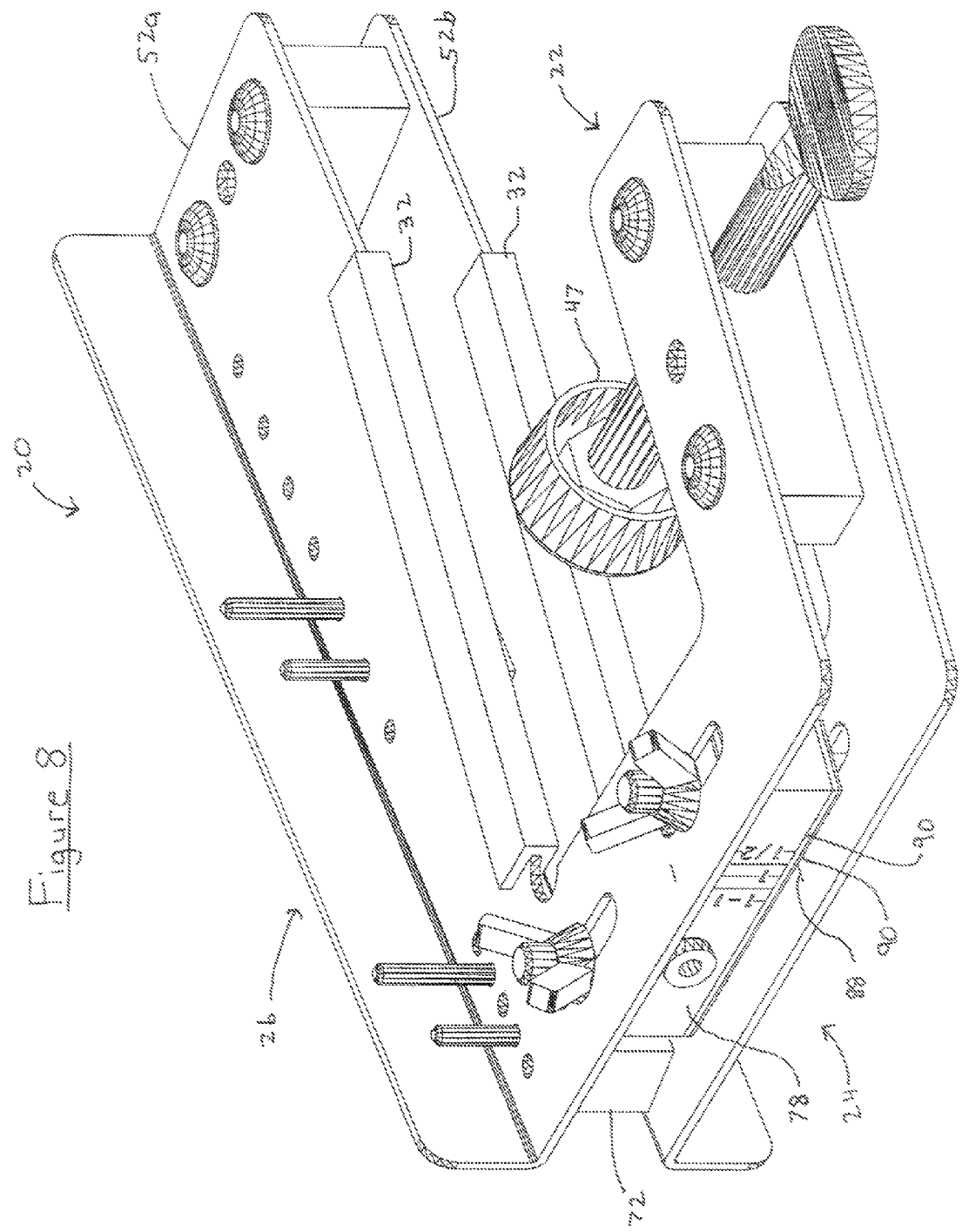
FIG. 8 illustrates a perspective view of the example fixture.

FIG. 8 illustrates a perspective view of the fixture 20 having an engaging member cap 47 for protecting the workpiece 30 during clamping.

Figure 9:
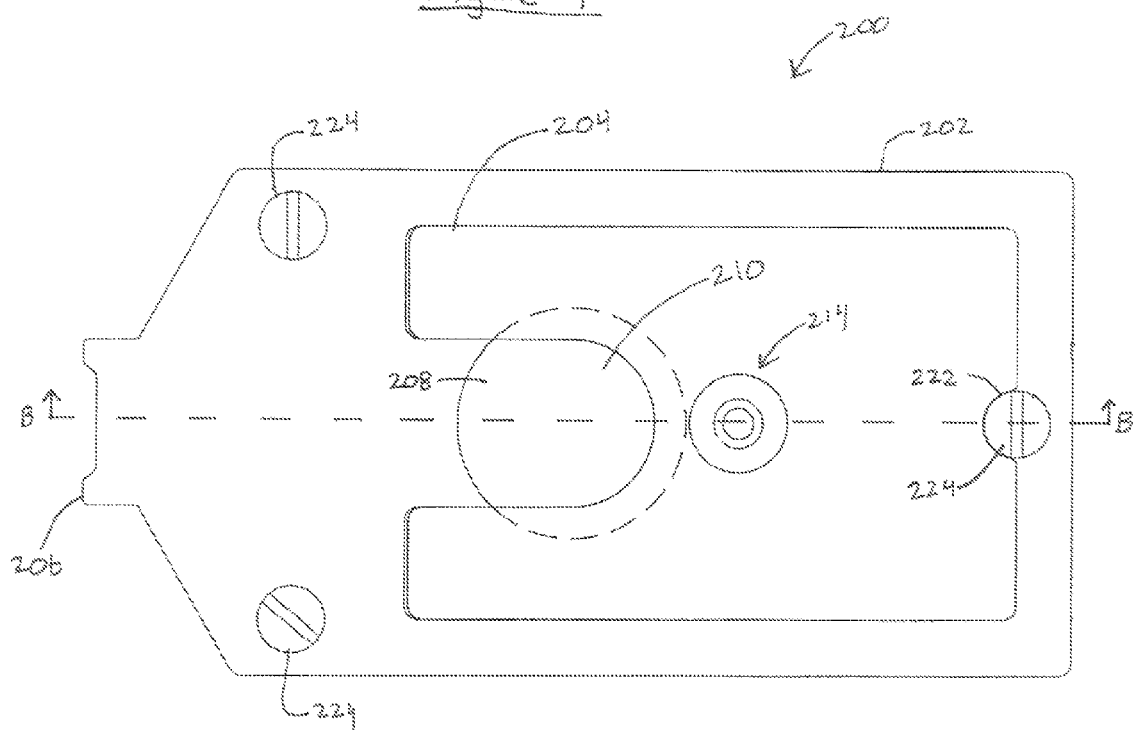
FIG. 9 illustrates a top view of an example mounting assembly.

FIG. 9 illustrates an example mounting assembly 200 having a base plate 202 and a retention plate 204. The base plate 202 includes a protrusion 206 for engaging an inner surface of the first and second fixture halves 52a and 52b and an engaging member opening 208 for accepting the upper support member 50 (FIG. 1). The retention plate 204 includes a u-shaped opening 210 for accepting the retainer member 48. The center of curvature of the u-shaped opening 210 is smaller than the center of curvature of the engaging member opening 208 to allow the retention plate 204 to secure the upper support member 50 in the engaging member opening 208.

Figure 10:
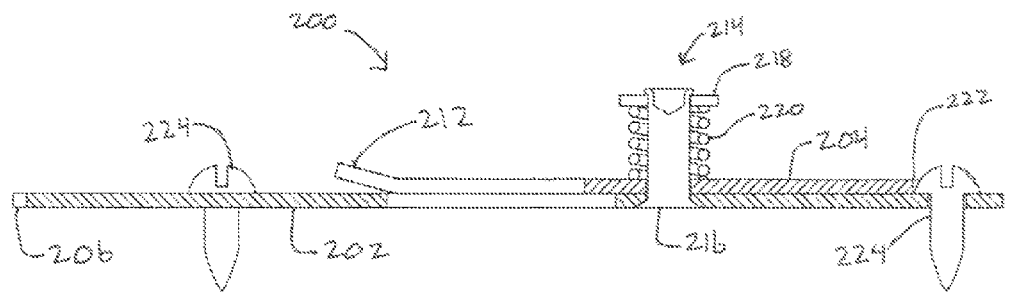
FIG. 10 illustrates a cross-sectional view of the example mounting assembly along line B-B of FIG. 9.

FIG. 10 illustrates a cross-sectional view of the mounting assembly 200 taken along line B-B of FIG. 9. The retention plate 204 includes an angled portion 212 for accepting the engaging member 46. A spring loaded member 214 allows the retention plate 204 to deflect relative to the base plate 202. The spring loaded member 214 includes a rivet 216, a washer 218, and a helical spring 220. A notch 222 in the retention plate 204 engages the fastener 224 to prevent the retention plate 204 from rotating relative to the base plate 202.

Figure 11:
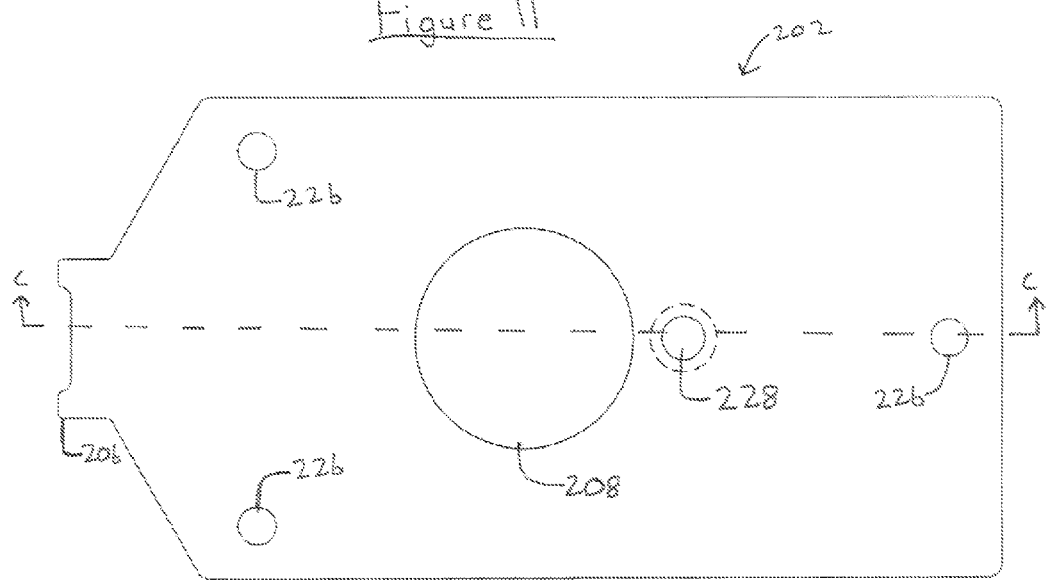
FIG. 11 illustrates a top view of a base plate of the example mounting assembly.
Figure 12:
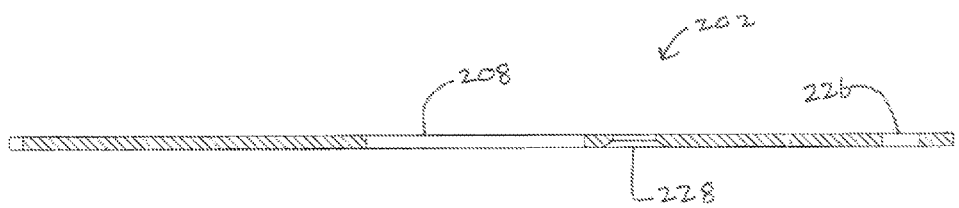
FIG. 12 illustrates a cross-sectional view of the base plate along line C-C of FIG. 11.

FIG. 11 illustrates a top view of the base plate 202. The base plate 202 includes the engaging member opening 208, fastener openings 226, and a spring loaded member opening 228. FIG. 12 illustrates a cross-sectional view of the base plate 202 taken along line C-C of FIG. 11.

Figure 13:
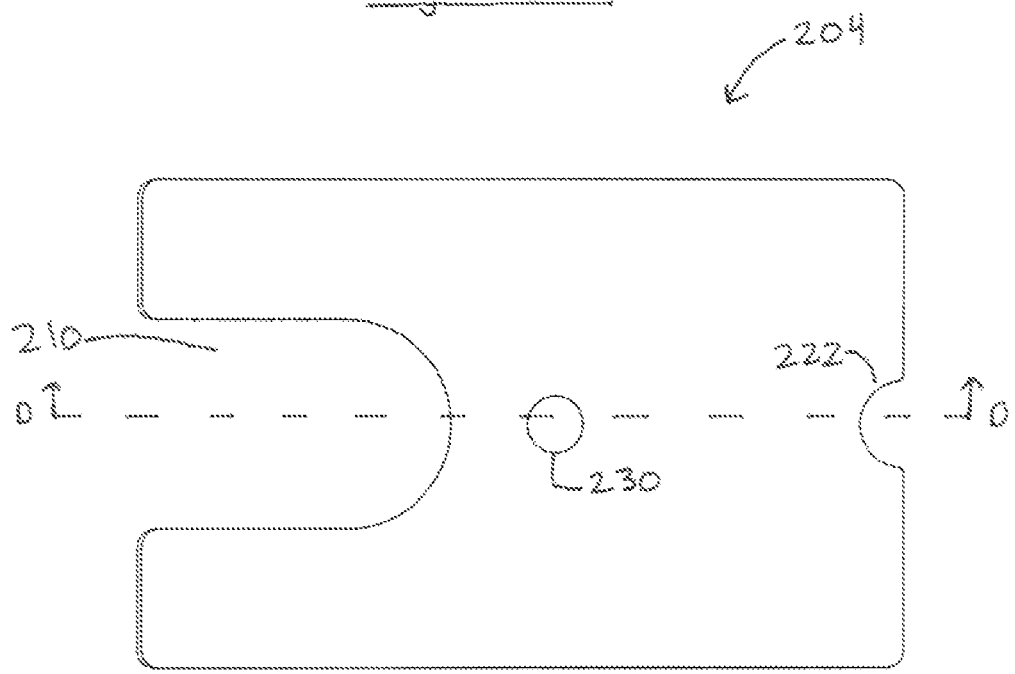
FIG. 13 illustrates a top view of a retention plate of the example mounting assembly.
Figure 14:
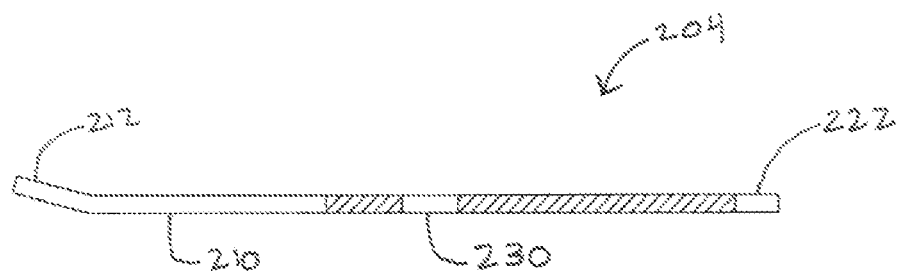
FIG. 14 illustrates a cross-sectional view of the retention plate along line D-D of FIG. 13.

FIG. 13 illustrates a top view of the retention plate 204 including the u-shaped opening 210, a spring loaded opening 230, and the notch 222. FIG. 14 illustrates a cross-sectional view of the retention plate 204 taken along line D-D of FIG. 13.

Figure 15:
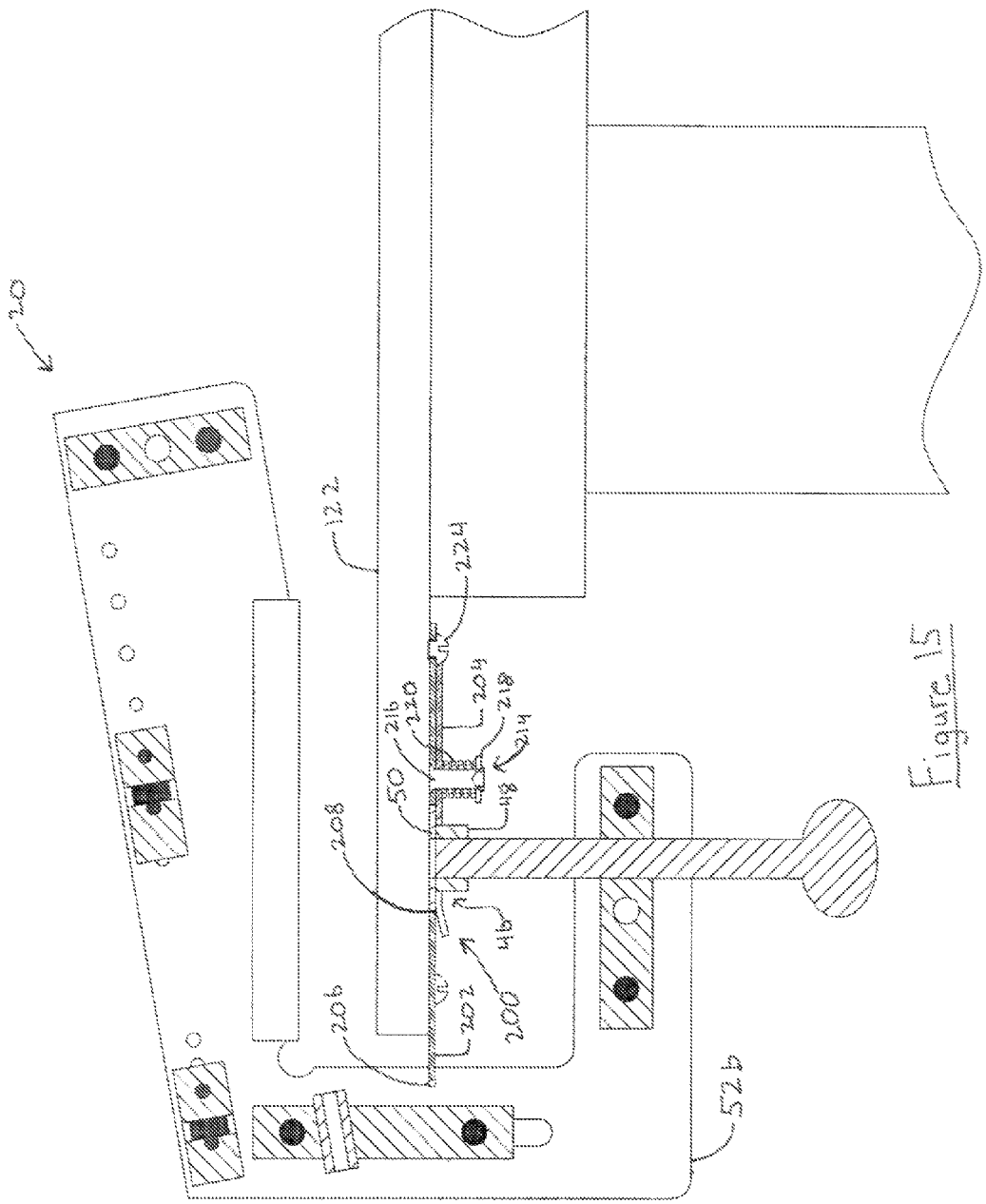
FIG. 15 illustrates a cross-sectional view of the example fixture mounted to the example mounting assembly.

FIG. 15 illustrates the fixture 20 and the mounting assembly 200 in cross section and the mounting assembly 200 attached to a mounting member 122 by fasteners 224. The upper support member 50 is accepted within the engaging member opening 208. The retention plate 204 surrounds the retainer member 48 and supports the upper support member 50 to secure the fixture 20 to the mounting assembly 200. The protrusion 206 on the base plate 202 engages the fixture 20 to prevent the fixture 20 from rotating about the engaging member 46 once attached to the mounting assembly 200.

The fixture 20 is secured in the mounting assembly 200 by bringing the engaging member 46 in contract with the base plate 202 and sliding the engaging member 46 against the base plate 202 to deflect the retention plate 204 to allow the upper support member 50 to enter the engaging member opening 208. The force required to deflect the retention plate 204 is controlled by the stiffness of the helical spring 220.

FIG. 16 illustrates an end view of fixtures 20, 20', and 20" attached by alignment rods 124. The alignment rods 124 may be threaded and include fasteners 126 that secure the fixtures 20, 20', and 20" together.

FIG. 17 illustrates a top view of the pocket 34 formed in the workpiece 30. The pocket 34 includes a first rounded end 34a and a second rounded end 34b connected by substantially straight side walls. The first rounded end 34a includes a screw opening 35 extending through the workpiece 30 from an outer edge into the pocket 34. FIG. 18 illustrates an end view of the workpiece 30 including the screw opening 35. FIG. 19 illustrates a cross-sectional view of the workpiece 30 taken along line E-E of FIG. 18. FIG. 20 illustrates a cross-sectional view of the workpiece 30 attached to the mating workpiece 31 by a screw 128.

FIG. 21 illustrates a top view of another example pocket 134 formed in the workpiece 30. The pocket 134 includes a rounded end 134a and a square end 134b connected by substantially straight sidewalls. A bottom of the pocket 134 tapers towards an upper surface of the workpiece 30. The rounded end 134a includes a screw opening 135 extending through the workpiece 30 from an outer edge into the pocket 134. FIG. 22 illustrates an end view of the workpiece 30 including the screw opening 135. FIG. 23 illustrates a cross-sectional view of the workpiece 30 taken along line F-F of FIG. 22.

Figure 24:
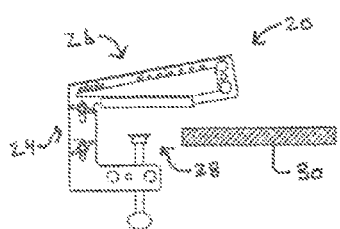
FIGS. 24-26 illustrate an example method of attached the workpiece to the example fixture.
Figure 25:
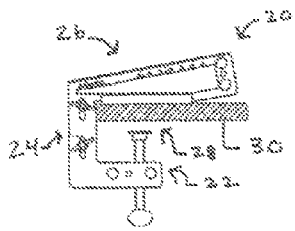
Figure 26:
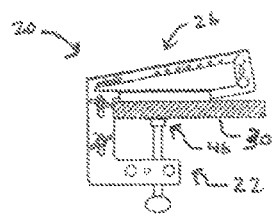

The workpiece 30 is attached to the fixture 20 by bringing the workpiece 30 in proximity of the fixture 20 (FIG. 24, the workpiece 30 is shown in cross section for clarity). The workpiece 30 is placed within the opening 28 adjacent the router guide portion 26 and the drill guide portion 24 (FIG. 25). The engaging member 46 extends from the clamping portion 22 to secure the workpiece 30 to the fixture 20 (FIG. 26).

Figure 27:
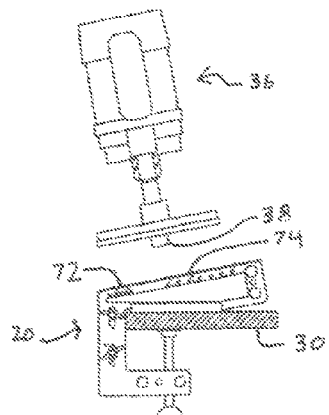
FIGS. 27-32 illustrate an example method of forming the example pocket mortise of FIG. 17.
Figure 28:
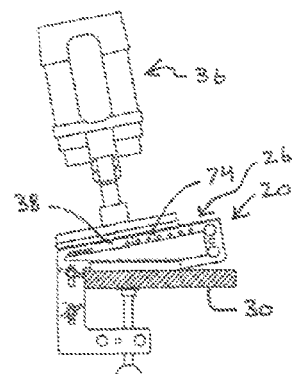
Figure 29:
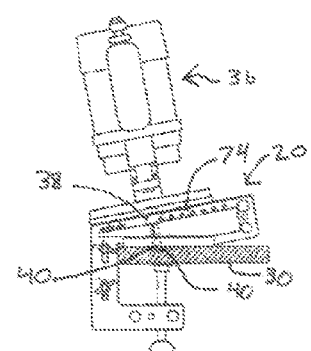
Figure 30:
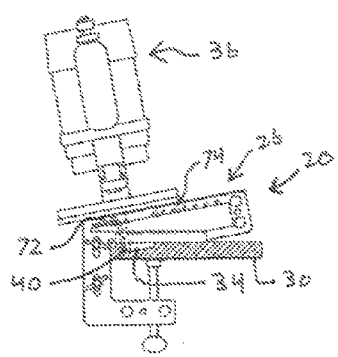
Figure 31:
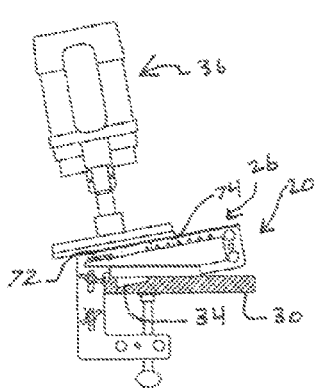
Figure 32:
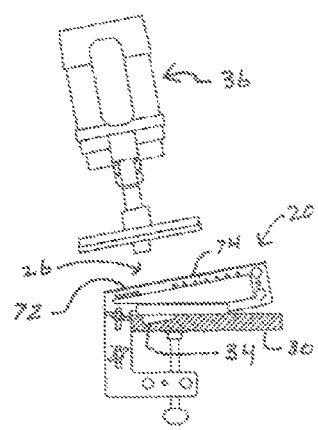
Figure 33:
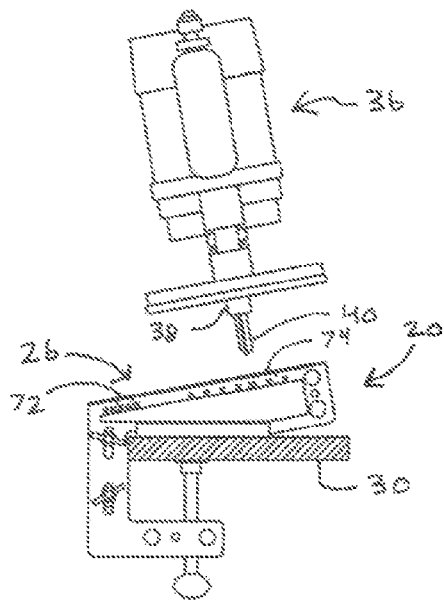
FIGS. 33-36 illustrate an example method of forming the example pocket mortise of FIG. 21.
Figure 34:
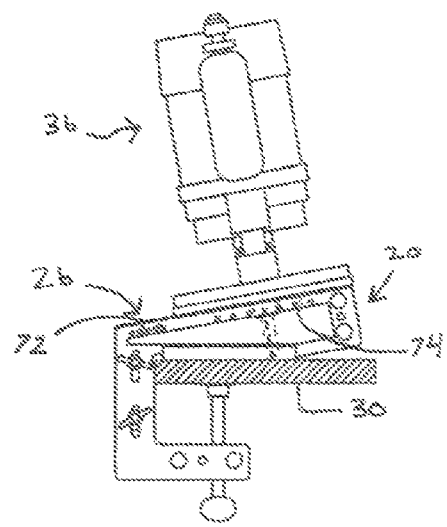
Figure 35:
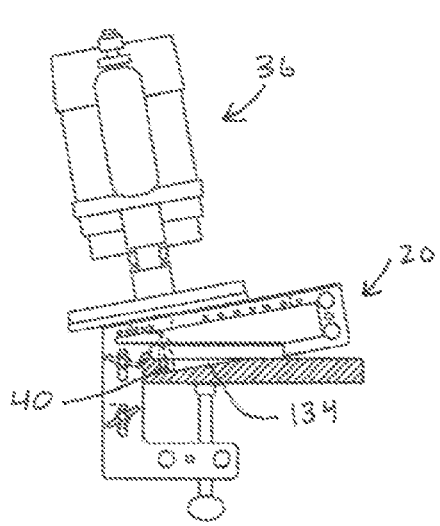

The pocket 34 is formed in the workpiece 30 by bringing the router 36 in proximity of the fixture 20 (FIG. 27). The router 36 is brought into contact with a support surface on the router guide portion 26. The collar 38 on the router 36 is accepted within the router guide portion 26 (FIG. 28). The router bit 40 is plunged in a direction parallel to an axis of rotation of the router bit 40 through the router guide portion 26 into the workpiece 30 (FIG. 29) and the collar 38 guides the router 36 within the router guide portion 26 between the first and second router stops 72 and 74 (FIGS. 29 and 30). After forming the pocket 34, the router bit 40 is raised from the plunged position out of the workpiece 30 (FIG. 31) and the router 36 is lifted away from the fixture 20 (FIG. 32).

The pocket 134 is formed in the workpiece 30 by removing or positioning the second router stop 74 so that the router bit 40 does not engage the workpiece 30 when fully extended in the router guide portion 26. The pocket 134 is formed with the router 36 as shown in FIGS. 33-36 or with a table router by bringing the router guide portion 26 into contact with a table router 136 as shown in FIGS. 37-40.

Figure 36:
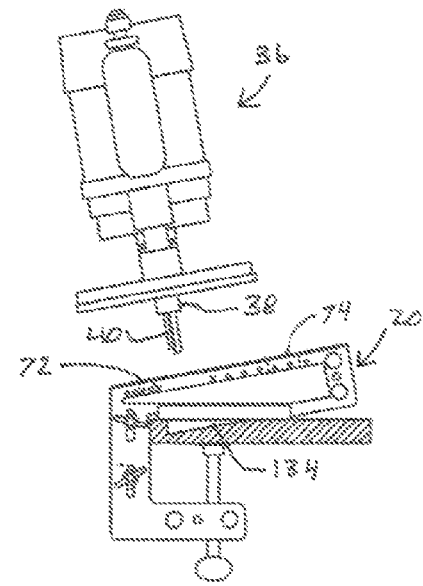
Figure 37:
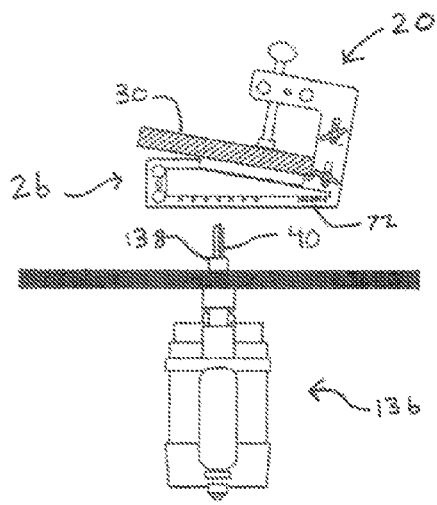
FIGS. 37-40 illustrate another example method of forming the example pocket mortise of FIG. 21.
Figure 38:
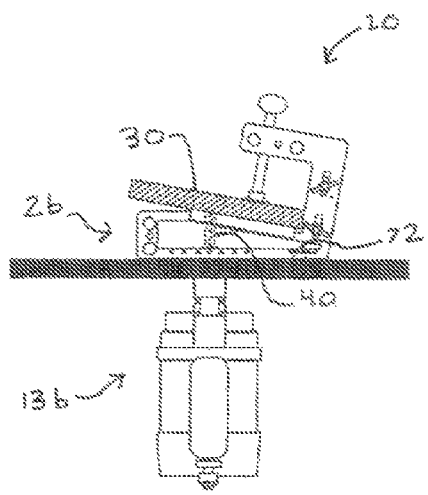
Figure 39:
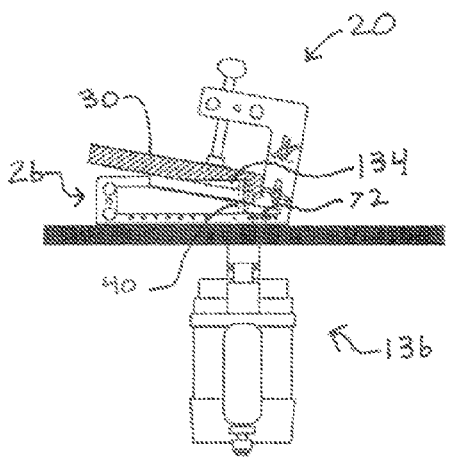
Figure 40:
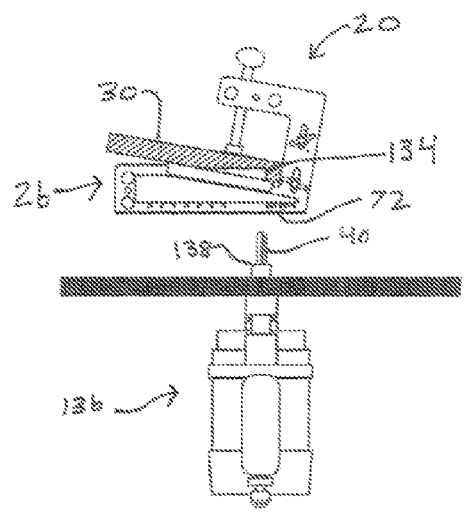

The screw opening 35 is formed in the workpiece 30 by aligning the central opening 82 (FIG. 5) with the lateral center of the pocket 34 by adjusting the spacers 90 (FIG. 5) and bringing the drill 39 in proximity of the fixture 20 (FIG. 41). The drill bit extends through the drill guide portion 24 into the workpiece 30 (FIG. 42). After forming the screw opening 35, the drill is removed from the fixture 20 (FIG. 43). The workpiece 30 is removed from the fixture 20 by retracting the engaging member 46 on the clamping portion 22 (FIG. 36). The screw opening 135 is formed in a similar manner as the screw opening 35.

Figure 45:
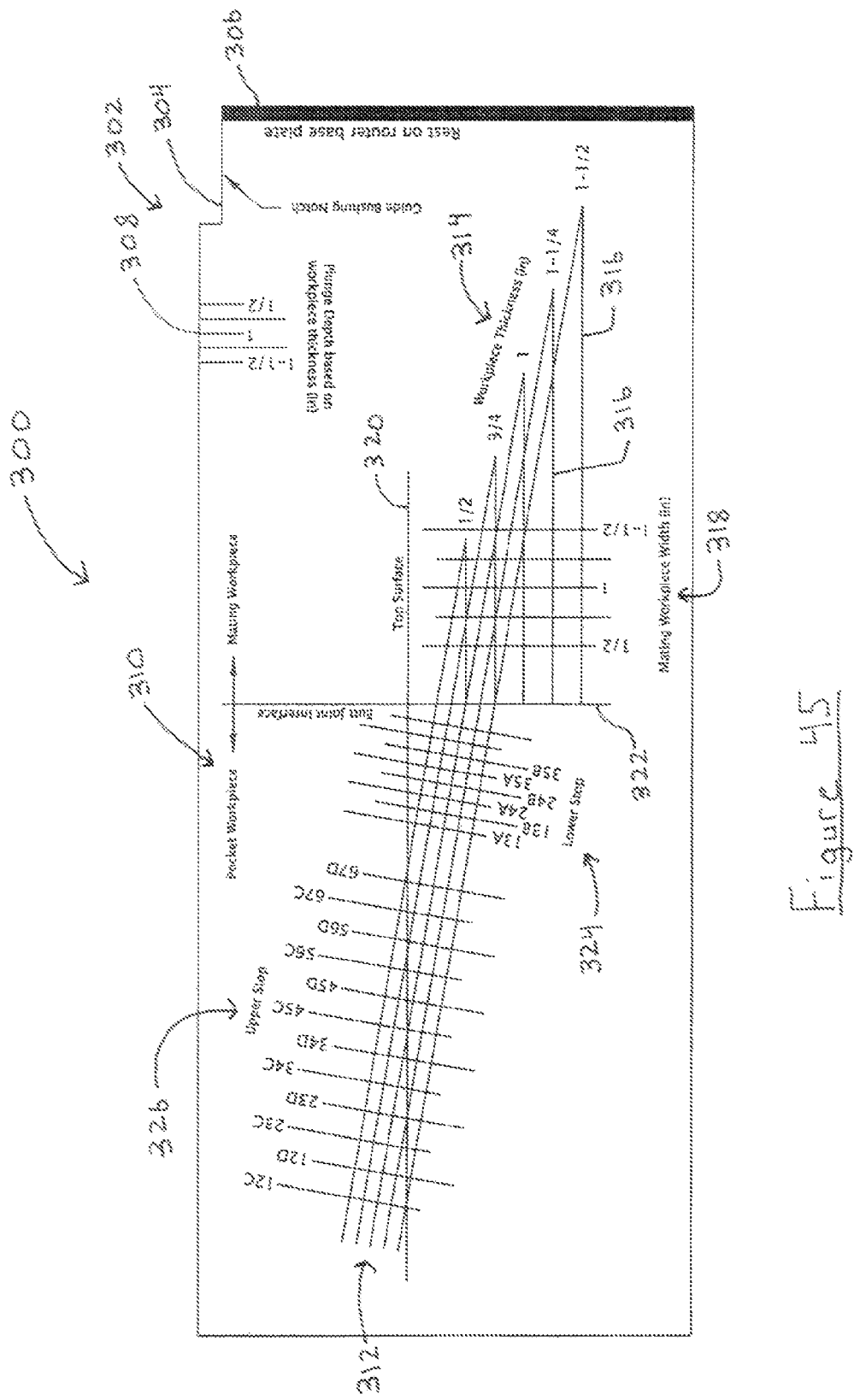
FIG. 45 illustrates an example adjustment template.
Figure 4B:
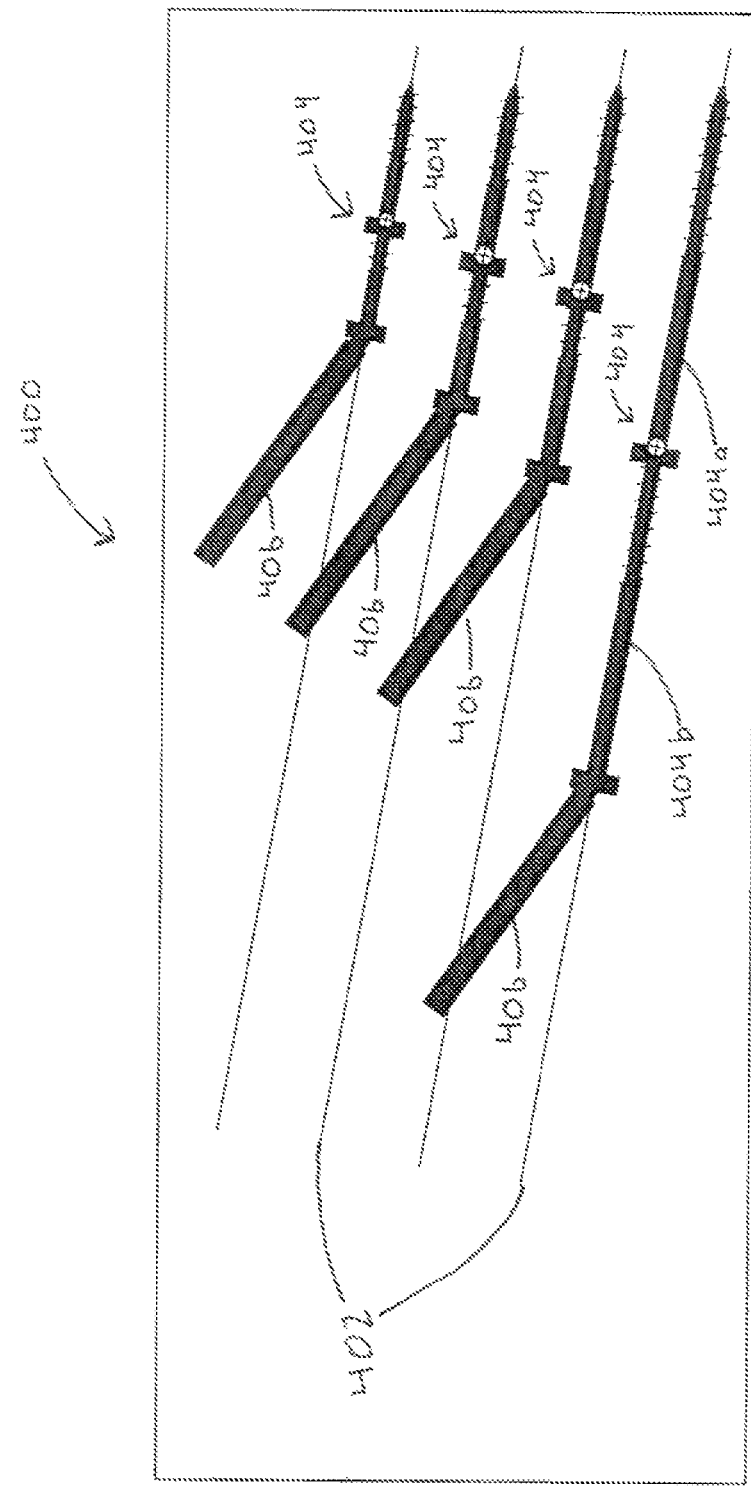

FIG. 45 illustrates a template 300 having a router depth portion 302 for setting the depth of the router bit 40 and a visualization portion 310 for visualizing the pocket 34 or 134 and joint prior to cutting the workpiece 30. The router depth portion 302 includes a notch 304 for accepting the collar 38 when the template edge 306 is rested against the base of the router 36 or table router 136 to allow the router bit 40 to be adjacent router bit depth markings 308. The plunge depth of the router 36 is adjusted until the end of the router bit 40 is aligned with the router bit depth marking 308 corresponding to the workpiece 30 thickness.

The visualization portion 310 includes screw centerlines 312 and horizontal bottom surface lines 316 that correspond to workpiece thickness markings 314. Mating workpiece width lines 318 represent the maximum penetration limited by the width of the mating workpiece 31 to prevent the screw from breaking through the sides of the mating workpiece 31. The top surface line 320 represents the top surface of both the workpiece 30 and the mating workpiece 31. The interface line 322 represents the joint interface between the workpiece 30 and the mating workpiece 31. First and second stop block positions 324 and 326 correspond to which of the first and second stop openings 60 and 62 (FIG. 3) used to fasten the first and second router stops 72 and 74 and the orientation of the first and second router stops 72 and 74, respectively. The markers 73 and 75 (FIGS. 4a and 4b) correspond to the orientation and markers 130 and 132 correspond to the fastener locations.

FIG. 46 illustrates an example transparency 400 for visualizing a joint on the template 300 having varying first and second stop block positions 324 and 326. The transparency 400 may be printed on Mylar or another similar transparent material. The transparency 400 includes pairs of screws 404 of varying lengths with their longitudinal axis aligned with centerlines 402. Each pair of screws include a first screw 404a that represents a fully installed screw and a second screw 404b that represents a screw positioned in the pocket prior to installation. Screw drivers 406 represent the clearance needed to engage a screw. The transparency 400 is placed on the template 300 and allows a user to quickly visualize screw penetration with various first and second stop block positions 324 and 326.

Figure 47:
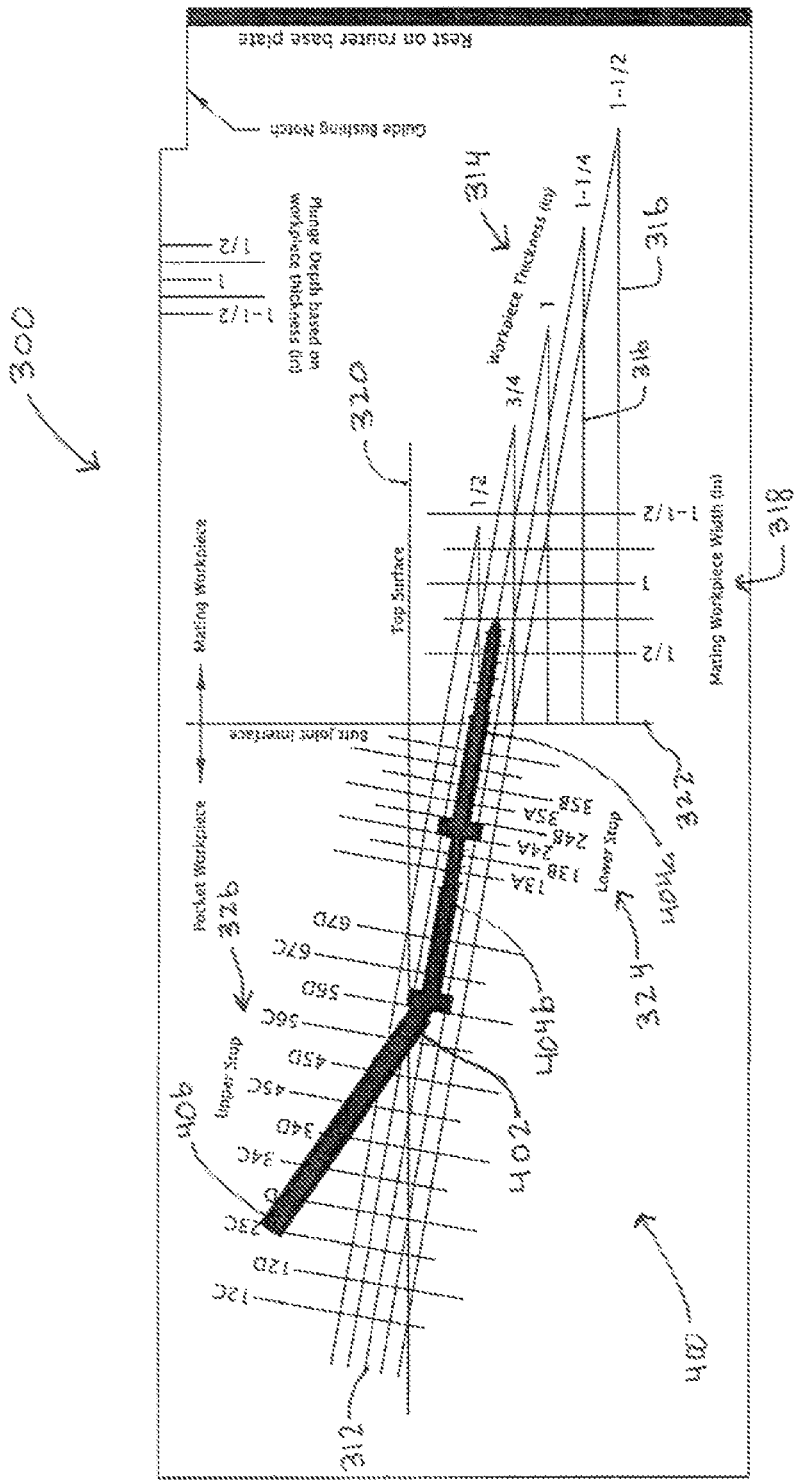
FIG. 47 illustrates an example of method of using the example adjustment template and the example transparency.

FIG. 47 illustrates an example use of the template 300 and transparency 400. Only the first and second screws 404a and 404b and the single screw driver 406 are shown for clarity. The centerline 402 of the transparency 400 is aligned with the screw centerline 312 on the template 300 that corresponds to the thickness of the workpiece 30 as indicated by the workpiece thickness markings 314, which is 1 in this example. The tip of the first screw 404a is positioned at a desired penetration or aligned with the mating workpiece width lines 318 if mating workpiece width would limit penetration. The first stop block position 324 is chosen by finding the line closes to the base of the head of the first screw 404a, which is 24B. The second stop block position 326 is chosen by finding the line spaced outwardly from the intersection of the top surface line 320 and the screw drive 406, which is 45D.

FIG. 48 illustrates a side view of another example woodworking fixture 520. The fixture 520 is similar to the fixture 20 but with the addition of a 5 preceding the reference numerals. The fixture 520 includes having a clamping portion 522, a drill guide portion 524, and a router guide portion 526. The fixture 520 includes an opening 528 for accepting the workpiece 30. The router guide portion 526 has an angle of incline β of approximately fifteen degrees. However, the angle of incline may vary depending on the application.

The preceding description is exemplary rather than limiting in nature. Variations and modifications to the disclosed examples may become apparent to those skilled in the art that do not necessarily depart from the essence of this disclosure.

What is claimed is:

1. A fixture comprising:
   a router guide portion including a router support surface configured for engaging a router and a workpiece support surface configured for directly engaging a workpiece;
   a drill guide portion including a drill bit member;
   an opening adjacent the router guide portion and the drill guide portion for accepting the workpiece;
   a clamping portion including a clamping member for securing the workpiece to the router guide portion; and
   a channel extending through the router guide portion, wherein a first router stop and a second router stop extend across the channel for engaging a portion of a router and the first router stop and the second router stop are adjustably mounted within the channel.

2. The fixture of claim 1 wherein the channel is defined on a first side by a first fixture half and on a second side by a second fixture half.

3. The fixture of claim 1 wherein an angle between the router support surface and the workpiece support surface is constant.

4. The fixture of claim 1 wherein an angle between the router support surface and the workpiece support surface is approximately 10 degrees.

5. The fixture of claim 1 wherein a sleeve having a central opening extends through the drill bit member for accepting a drill bit.

6. The fixture of claim 5 wherein the drill bit member is adjustable relative to the router guide portion in a first direction and a second direction perpendicular to the first direction.

7. The fixture of claim 1 wherein a first fixture half and a second fixture half form the drill guide portion and the clamping portion.

8. The fixture of claim 7 wherein the drill bit member and the clamping member are attached to the first fixture half and the second fixture half.

9. The fixture of claim 1 wherein the channel is configured to engage a collar on the router.

10. The fixture of claim 1 wherein the router support surface is located on a first side of the router guide and the workpiece support surface is located on a second side of the router guide opposite from the first side.

11. The fixture of claim 1 wherein an angle between the router support surface and the workpiece support surface is constant.

12. The fixture of claim 1 wherein the router guide is configured to allow the router to move independently from the router guide.

13. The fixture of claim 1 where in the router support surface is fixed relative to the workpiece support surface.

* * * * *